United States Patent
Tsuneki et al.

(10) Patent No.: US 11,023,827 B2
(45) Date of Patent: Jun. 1, 2021

(54) MACHINE LEARNING DEVICE, SERVO CONTROL DEVICE, SERVO CONTROL SYSTEM, AND MACHINE LEARNING METHOD FOR SUPPRESSING VARIATION IN POSITION ERROR USING FEEDFORWARD CONTROL

(71) Applicant: FANUC CORPORATION, Yamanashi (JP)

(72) Inventors: Ryoutarou Tsuneki, Yamanashi (JP); Satoshi Ikai, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 209 days.

(21) Appl. No.: 16/272,099

(22) Filed: Feb. 11, 2019

(65) Prior Publication Data

US 2019/0287007 A1    Sep. 19, 2019

(30) Foreign Application Priority Data

Mar. 19, 2018   (JP) .............................. JP2018-051219

(51) Int. Cl.
*G06N 20/00*    (2019.01)
*G05B 13/02*    (2006.01)

(52) U.S. Cl.
CPC ......... *G06N 20/00* (2019.01); *G05B 13/0265* (2013.01)

(58) Field of Classification Search
None
See application file for complete search history.

(56) References Cited

U.S. PATENT DOCUMENTS 5,191,272 A * 3/1993 Torii .................... G05B 13/024
                                                    318/560
5,597,588 A * 1/1997 Totani ..................... B29C 45/78
                                                    425/143

(Continued)

FOREIGN PATENT DOCUMENTS

CN          1749888         3/2006
CN        105159229        12/2015

(Continued)

OTHER PUBLICATIONS

Lange, F. et al. (1999). "Adaptive minimization of the maximal path deviations of industrial robots." 1999 European Control Conference (ECC). IEEE, 1999. (Year: 1999).*

(Continued)

*Primary Examiner* — Kamran Afshar
*Assistant Examiner* — Benjamin J Buss
(74) *Attorney, Agent, or Firm* — Wenderoth, Lind & Ponack, L.L.P.

(57) ABSTRACT

A machine learning device performs machine learning with respect to a servo control device including at least two feedforward calculation units among a position feedforward calculation unit configured to calculate a position feedforward term on the basis of a position command, a velocity feedforward calculation unit configured to calculate a velocity feedforward term on the basis of a position command, and a current feedforward calculation unit configured to calculate a current feedforward term on the basis of a position command. Machine learning related to the coefficients of a transfer function of one feedforward calculation unit among the at least two feedforward calculation units is performed earlier than machine learning related to the coefficients of a transfer function of the other feedforward calculation unit.

20 Claims, 8 Drawing Sheets

(56) References Cited

U.S. PATENT DOCUMENTS

| | | | | |
|---|---|---|---|---|
| 5,892,742 | A * | 4/1999 | Yamashita | G11B 7/08517 369/44.27 |
| 5,991,670 | A * | 11/1999 | Mufford | H01M 8/04992 701/22 |
| 6,556,980 | B1 * | 4/2003 | Cheng | G05B 13/027 706/14 |
| 6,965,578 | B1 * | 11/2005 | Kappes | H04B 3/23 370/286 |
| 8,014,881 | B2 * | 9/2011 | Baggen | G03F 7/70725 700/44 |
| 8,902,535 | B1 * | 12/2014 | Nie | G11B 5/5547 360/75 |
| 10,439,511 | B2 * | 10/2019 | Wang | H02J 3/26 |
| 2003/0016607 | A1 * | 1/2003 | Cho | G11B 7/0945 369/47.42 |
| 2003/0169010 | A1 * | 9/2003 | Tomita | G05B 19/19 318/652 |
| 2004/0183494 | A1 * | 9/2004 | Nagaoka | G05B 19/19 318/632 |
| 2007/0078529 | A1 * | 4/2007 | Thiele | G05B 13/048 700/29 |
| 2008/0036413 | A1 * | 2/2008 | Ohta | G05B 13/048 318/609 |
| 2012/0253514 | A1 * | 10/2012 | Sugimoto | G05B 13/0265 700/250 |
| 2013/0031036 | A1 * | 1/2013 | Kojima | G06N 20/00 706/12 |
| 2013/0173026 | A1 * | 7/2013 | Kawana | G05B 5/01 700/30 |
| 2016/0080658 | A1 * | 3/2016 | Tanaka | G05B 13/04 348/369 |
| 2017/0160706 | A1 * | 6/2017 | Dull | G05B 13/042 |
| 2018/0267499 | A1 * | 9/2018 | Tsuneki | G06F 15/76 |
| 2018/0292808 | A1 * | 10/2018 | Ikai | G05B 19/18 |
| 2019/0028043 | A1 * | 1/2019 | Oho | H02P 6/17 |
| 2019/0196417 | A1 * | 6/2019 | Uno | G05B 13/0265 |
| 2019/0287007 | A1 * | 9/2019 | Tsuneki | G06N 3/08 |
| 2020/0049094 | A1 * | 2/2020 | Charbonnel | F02D 17/02 |
| 2020/0133208 | A1 * | 4/2020 | Tsuneki | G05B 13/0265 |
| 2020/0192303 | A1 * | 6/2020 | Saito | B25J 9/1651 |
| 2020/0305029 | A1 * | 9/2020 | Wigren | H04W 4/70 |

FOREIGN PATENT DOCUMENTS

| | | |
|---|---|---|
| CN | 105359406 | 2/2016 |
| CN | 106411224 | 2/2017 |
| CN | 107276465 | 10/2017 |
| JP | 2-85902 | 3/1990 |
| JP | 3-15911 | 1/1991 |
| JP | 4-84303 | 3/1992 |
| JP | 7-129535 | 5/1995 |
| JP | 2003-84804 | 3/2003 |
| JP | 2010-33172 | 2/2010 |
| JP | 2017-102613 | 6/2017 |
| JP | 2017-117366 | 6/2017 |

OTHER PUBLICATIONS

Han, C.-H. (2009). "High Precision Control of Indirect Drive Systems Based on End-effector Sensor Information". Diss. UC Berkeley, 2009. 127 pages. (Year: 2009).*

Kambara, H. et al. (2004). "Learning arm's posture control using reinforcement learning and feedback-error-learning." The 26th Annual International Conference of the IEEE Engineering in Medicine and Biology Society. vol. 1. IEEE, 2004. DOI:10.1109/IEMBS .2004. 1403200 (Year: 2004).*

Grotjahn, M. et al. (2002). "Model-based feedforward control in industrial robotics." The International Journal of Robotics Research 21.1 (2002): 45-60. (Year: 2002).*

Stuckelmaier, P. et al. (2017). "Iterative improvement of path accuracy of industrial robots using external measurements." 2017 IEEE International Conference on Advanced Intelligent Mechatronics (AIM). IEEE, 2017. (Year: 2017).*

Lange, F. et al. (2005). "Calibration and synchronization of a robot-mounted camera for fast sensor-based robot motion." Proceedings of the 2005 IEEE International Conference on Robotics and Automation. IEEE, 2005. (Year: 2005).*

Lange, F. et al. (2001). "A universal sensor control architecture considering robot dynamics." Conference Documentation International Conference on Multisensor Fusion and Integration for Intelligent Systems. MFI 2001 (Cat. No. 01TH8590). IEEE, 2001. (Year: 2001).*

Lange, F. et al. (1999). "Learning Accurate Path Control of Industrial Robots with Joint Elasticity". Proc. 1999 IEEE Int'l Conf on Robots & Automation. Detroit, Michigan. May 1999. pp. 2084-2089. (Year: 1999).*

Notification of Reasons for Refusal dated Mar. 3, 2020 in Japanese Application No. 2018-051219.

Office Action dated Jan. 25, 2021 in Chinese Patent Application No. 201910197184.8.

* cited by examiner

MACHINE LEARNING DEVICE, SERVO CONTROL DEVICE, SERVO CONTROL SYSTEM, AND MACHINE LEARNING METHOD FOR SUPPRESSING VARIATION IN POSITION ERROR USING FEEDFORWARD CONTROL

This application is based on and claims the benefit of priority from Japanese Patent Application No. 2018-051219, filed on 19 Mar. 2018, the content of which is incorporated herein by reference.

BACKGROUND OF THE INVENTION

Field of the Invention

The present invention relates to a machine learning device that performs machine learning with respect to a servo control device which uses feedforward control in which at least two feedforward calculation units form multiple loops, a servo control device and a servo control system including the machine learning device, and a machine learning method.

Related Art

A servo control device which uses feedforward control is disclosed in Patent Documents 1 to 4, for example. A servo control device disclosed in Patent Document 1 includes a neural network that calculates a feedforward term of a velocity command from a position command value and adds the feedforward term to a velocity command output from a position control unit and a neural network that calculates a feedforward term of a torque command from a velocity command value and adds the feedforward term to a torque command output from a velocity control unit. The neural networks learn a variation in the moment of inertia of a driving system and resonance characteristics and the like of the driving system to calculate an optimal feedforward term.

A feedforward control device disclosed in Patent Document 2 include a position feedforward calculation unit that calculates a feedforward term of a velocity command from a position command value and adds the feedforward term to a velocity command output from a position controller and a velocity feedforward calculation unit that calculates a feedforward term of a torque command from a position command value and adds the feedforward term to a torque command output from a velocity controller. The feedforward control device disclosed in Patent Document 2 also includes a learning controller that learns a gain of the position feedforward calculation unit on the basis of a position error which is a difference between the position command value and the feedback position detection value and a learning controller that learns a gain of the velocity feedforward calculation unit on the basis of the position error or a velocity error which is a difference between the velocity command value and the feedback velocity detection value.

An optimal command creation device disclosed in Patent Document 3 receives a command value, creates an ideal operation command with which a control target can realize a desired operation, and outputs the operation command to a servo control unit that controls the control target. The optimal command creation device includes a control target model and a learning control unit that performs learning control or a prediction control unit that performs prediction control so that the control target model realizes a desired operation.

A servo control device disclosed in Patent Document 4 includes a feedforward control system including a velocity feedforward creation unit that generates a velocity feedforward signal on the basis of a position command, a torque feedforward creation unit that generates a torque feedforward signal on the basis of a position command, and a velocity feedforward changing unit that generates a velocity feedforward change signal on the basis of a velocity feedforward signal and a torque feedforward signal.

Patent Document 1: Japanese Unexamined Patent Application, Publication No. H4-084303
Patent Document 2: Japanese Unexamined Patent Application, Publication No. H2-085902
Patent Document 3: Japanese Unexamined Patent Application, Publication No. 2003-084804
Patent Document 4: Japanese Unexamined Patent Application, Publication No. 2010-033172

SUMMARY OF THE INVENTION

In Patent Document 2, the servo control device performs learning on position feedforward control and learning on velocity feedforward control simultaneously using a learning controller that performs learning on position feedforward control and a learning controller that performs learning on velocity feedforward control. However, when the servo control device performs learning on position feedforward control and learning on velocity feedforward control simultaneously, the amount of information processed for the learning increases. Even when one learning controller changes a feedforward term of a velocity command on the basis of a position error in order to reduce the position error, if the other learning controller changes a feedforward term of a torque velocity command on the basis of the position error, the position error changes due to the influence of the change. Therefore, the learning operations of the two learning controllers interfere with each other and the amount of information processed for the learning operations of the two learning controllers increases.

An object of the present invention is to provide a machine learning device that performs machine learning with respect to a servo control device which uses feedforward control in which at least two feedforward calculation units form multiple loops, the servo control device capable of reducing the amount of information processed for machine learning to shorten the settling time of the machine learning and suppressing a variation in position error to achieve high accuracy, and to provide a servo control device and a servo control system including the machine learning device, and a machine learning method.

(1) A machine learning device according to the present invention is a machine learning device (for example, a machine learning device 200 to be described later) configured to perform machine learning related to optimization of coefficients of at least two feedforward calculation units (for example, a position feedforward calculation unit 109 and a velocity feedforward calculation unit 110 to be described later) with respect to a servo control device (for example, a servo control device 100 to be described later) configured to control a servo motor (for example, a servo motor 300 to be described later) configured to drive a shaft of a machine tool or an industrial machine using feedforward control in which the at least two feedforward calculation units form multiple loops, wherein when one command compensated by a feedforward term calculated by one of the at least two feedforward calculation units is a command on an inner side when seen from the servo motor, than another command compensated by a feedforward term calculated by the other feedforward calculation unit, after machine learning related to optimization of the coefficients of the one feedforward calculation unit is performed, machine learning related to optimization of the coefficients of the other feedforward calculation unit is performed on the basis of the optimized coefficients of the one feedforward calculation unit obtained by the machine learning related to the optimization of the coefficients of the one feedforward calculation unit.

(2) In the machine learning device according to (1), the at least two feedforward calculation units may be at least two feedforward calculation units among a position feedforward calculation unit (for example, a position feedforward calculation unit 109 to be described later) configured to calculate a first feedforward term of a velocity command on the basis of a position command, a velocity feedforward calculation unit (for example, a velocity feedforward calculation unit 110 to be described later) configured to calculate a second feedforward term of a torque command on the basis of a position command, and a current feedforward calculation unit (for example, a current feedforward calculation unit 114 to be described later) configured to calculate a third feedforward term of a current command on the basis of a position command, the one command and the other command may be two commands among the velocity command, the torque command, and the current command, and the servo motor may be driven according to the torque command or the current command.

(3) In the machine learning device according to (2), the first feedforward calculation unit may be the velocity feedforward calculation unit, and the other feedforward calculation unit may be the position feedforward calculation unit.

(4) In the machine learning device according to (2), the servo control device may include the position feedforward calculation unit, the velocity feedforward calculation unit, and the current feedforward calculation unit, and the one feedforward calculation unit may be the velocity feedforward calculation unit or the current feedforward calculation unit, and the other feedforward calculation unit may be the position feedforward calculation unit.

(5) In the machine learning device according to any one of (1) to (4), initial setting values of the coefficients of the transfer function of the other feedforward calculation unit may be the same values as initial setting values of the coefficients of the transfer function of the one feedforward calculation unit.

(6) The machine learning device according to any one of (1) to (5) may further include: a state information acquisition unit (for example, a state information acquisition unit 201 to be described later) configured to acquire, from the servo control device, state information including a servo state including at least a position error and a combination of the coefficients of the transfer function of the one or the other feedforward calculation unit by making the servo control device execute the predetermined machining program;

an action information output unit (for example, an action information output unit 203 to be described later) configured to output action information including adjustment information of the combination of the coefficients included in the state information to the servo control device;

a reward output unit (for example, a reward output unit 2021 to be described later) configured to output a reward value in reinforcement learning, based on the position error included in the state information; and a value function updating unit (for example, a value function updating unit 2022 to be described later) configured to update a value function on the basis of the reward value output by the reward output unit, the state information, and the action information.

(7) In the machine learning device according to (6), the reward output unit may output the reward value on the basis of an absolute value of the position error.

(8) The machine learning device according to (6) or (7) may further include: an optimization action information output unit (for example, an optimization action information output unit 205 to be described later) configured to generate and output a combination of the coefficients of the transfer function of the at least two feedforward calculation unit on the basis of the value function updated by the value function updating unit.

(9) A servo control system according to the present invention is a servo control system including: the machine learning device according to any one of (1) to (8); and a servo control device configured to control a servo motor configured to drive a shaft of a machine tool or an industrial machine using feedforward control in which at least two feedforward calculation units form multiple loops.

(10) A servo control device according to the present invention is a servo control device including: the machine learning device according to any one of (1) to (8); and at least two feedforward calculation units, wherein the servo control device controls a servo motor configured to drive a shaft of a machine tool or an industrial machine using feedforward control in which the at least two feedforward calculation units form multiple loops.

(11) A machine learning method according to the present invention is a machine learning method of a machine learning device configured to perform machine learning related to optimization of coefficients of at least two feedforward calculation units with respect to a servo control device configured to control a servo motor configured to drive a shaft of a machine tool or an industrial machine using feedforward control in which the at least two feedforward calculation units form multiple loops, wherein when one command compensated by a feedforward term calculated by one of the at least two feedforward calculation units is a command on an inner side when seen from the servo motor, than another command compensated by a feedforward term calculated by the other feedforward calculation unit, after machine learning related to optimization of the coefficients of the one feedforward calculation unit is performed, machine learning related to optimization of the coefficients of the other feedforward calculation unit is performed on the basis of the optimized coefficients of the one feedforward calculation unit obtained by the machine learning related to the optimization of the coefficients of the one feedforward calculation unit.

According to the present invention, it is possible to provide a machine learning device that performs machine learning with respect to a servo control device which uses feedforward control in which at least two feedforward calculation units form multiple loops, the servo control device capable of shortening the settling time of the machine learning and suppressing a variation in position error to achieve high accuracy.

DETAILED DESCRIPTION OF THE INVENTION

Hereinafter, an embodiment of the present invention will be described with reference to the drawings.

First Embodiment

Figure 1:
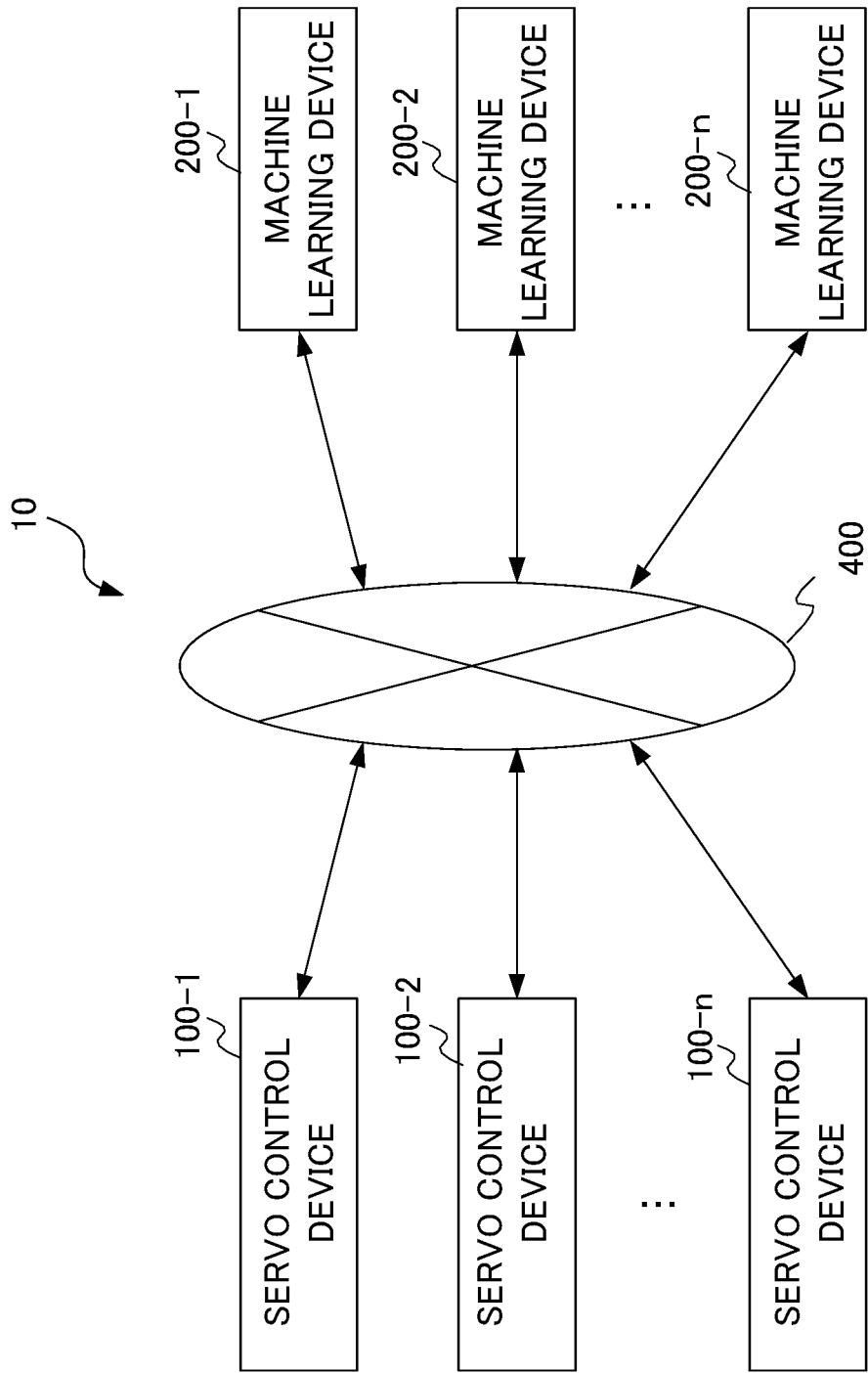
FIG. 1 is a block diagram illustrating a servo control system according to a first embodiment of the present invention.

FIG. 1 is a block diagram illustrating a servo control system of a first embodiment of the present invention. As illustrated in FIG. 1, a servo control system 10 includes n servo control devices 100-1 to 100-n, n machine learning devices 200-1 to 200-n, and a network 400. Here, n is an arbitrary natural number. It is assumed that the machine learning devices 200-1 to 200-n of the first embodiment perform reinforcement learning related to coefficients of a position feedforward calculation unit 109 and a velocity feedforward calculation unit 110 as will be described later as an example of machine learning. The position feedforward calculation unit 109 and the velocity feedforward calculation unit 110 form multiple loops in the servo control devices 100-1 to 100-n. The present invention is not limited to machine learning related to the coefficients of the position feedforward calculation unit 109 and the velocity feedforward calculation unit 110. That is, the present invention can be applied to machine learning related to a feedforward calculation unit that forms multiple loops other than the position feedforward calculation unit 109 and the velocity feedforward calculation unit 110. Moreover, machine learning in the present invention is not limited to reinforcement learning but the present invention can be also applied to a case of performing another machine learning (for example, supervised learning).

The servo control device 100-1 and the machine learning device 200-1 are paired in a one-to-one relationship and are communicably connected. The servo control devices 100-2 to 100-n and the machine learning devices 200-2 to 200-n are connected similarly to the servo control device 100-1 and the machine learning device 200-1. Although n pairs of the servo control devices 100-1 to 100-n and the machine learning device 200-1 to 200-n are connected via the network 400 in FIG. 1, the n pairs of the servo control devices 100-1 to 100-n and the machine learning devices 200-1 to 200-n may be connected directly via connection interfaces, respectively. A plurality of n pairs of the servo control devices 100-1 to 100-n and the machine learning devices 200-1 to 200-n may be provided in the same plant, for example, and may be provided in different plants.

The network 400 is a local area network (LAN) constructed in a plant, the Internet, a public telephone network, or a combination thereof, for example. A specific communication scheme of the network 400, whether the network uses a cable connection or a wireless connection, and the like are not particularly limited.

Figure 2:
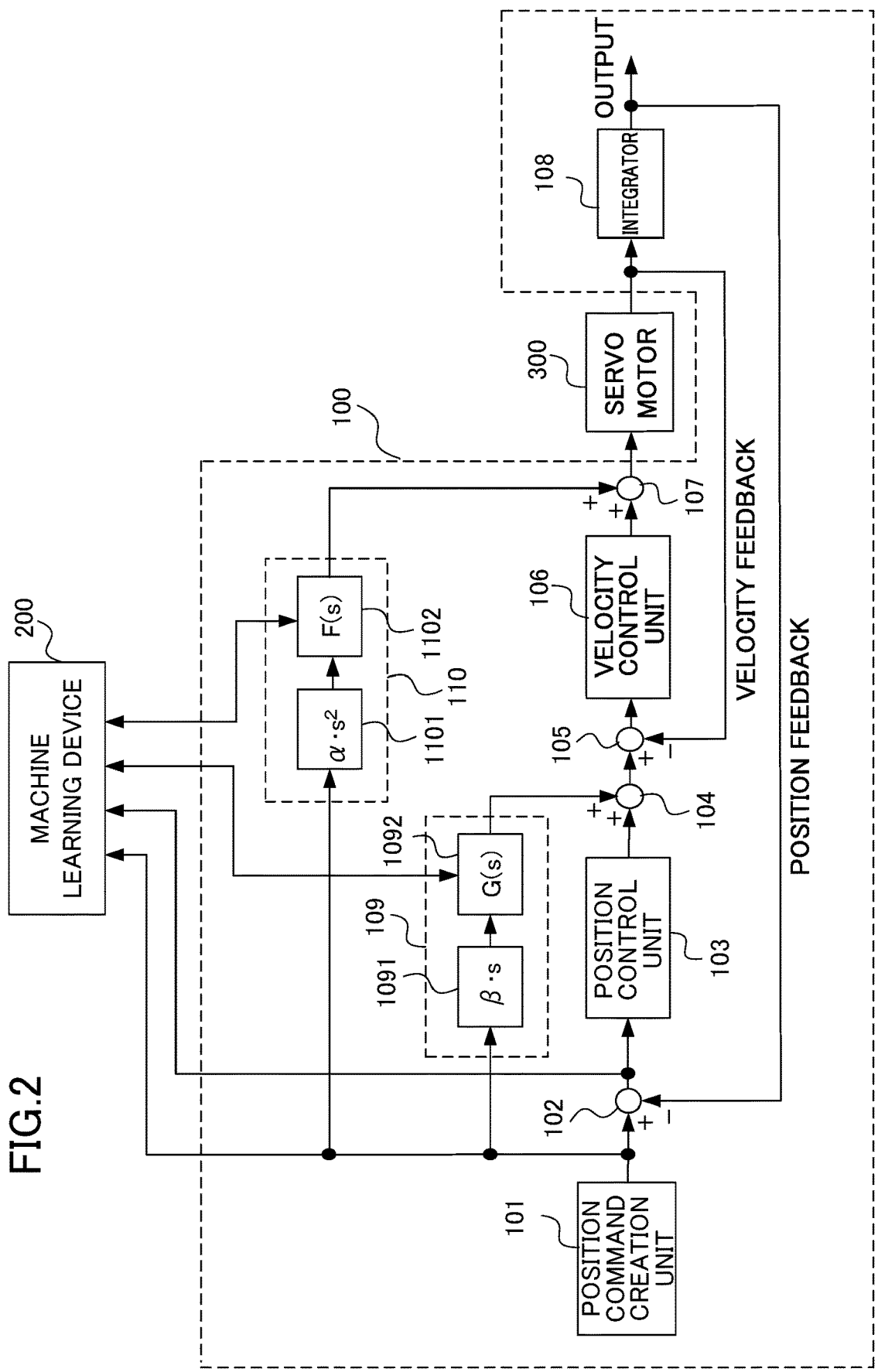
FIG. 2 is a block diagram illustrating a pair made up of a servo control device and a machine learning device of the servo control system according to the first embodiment of the present invention and a motor.

FIG. 2 is a block diagram illustrating a pair made up of a servo control device and a machine learning device of the servo control system according to the first embodiment of the present invention and a motor. The servo control device 100 and the machine learning device 200 illustrated in FIG. 2 correspond to the servo control device 100-1 and the machine learning device 200-1 illustrated in FIG. 2, for example. A servo motor 300 is included in a control target (for example, a machine tool, a robot, or an industrial machine) of the servo control device 100. The servo control device 100 may be provided as a part of a machine tool, a robot, an industrial machine, or the like together with the servo motor 300.

First, the servo control device 100 will be described. The servo control device 100 includes a position command creation unit 101, a subtractor 102, a position control unit 103, an adder 104, a subtractor 105, a velocity control unit 106, an adder 107, an integrator 108, a position feedforward calculation unit 109, and a velocity feedforward calculation unit 110. The position feedforward calculation unit 109 includes a differentiator 1091 and a position feedforward processing unit 1092. The velocity feedforward calculation unit 110 includes a double differentiator 1101 and a velocity feedforward processing unit 1102. The position command creation unit 101 creates a position command value and outputs the created position command value to the subtractor 102, the position feedforward calculation unit 109, the velocity feedforward calculation unit 110, and the machine learning device 200. The subtractor 102 calculates a difference between the position command value and a feedback detection position and outputs the difference to the position control unit 103 and the machine learning device 200 as a position error.

The position command creation unit 101 creates a position command value on the basis of a program for operating the servo motor 300. The servo motor 300 is included in a machine tool, for example. In a machine tool, when a table having a workpiece (a work) mounted thereon moves in an X-axis direction and a Y-axis direction, the servo control device 100 and the servo motor 300 illustrated in FIG. 2 are provided in the X-axis direction and the Y-axis direction, respectively. When the table is moved in directions of three or more axes, the servo control device 100 and the servo motor 300 are provided in the respective axis directions. The position command creation unit 101 sets a feed rate and creates a position command value so that a machining shape designated by the machining program is obtained.

The position control unit 103 outputs a value obtained by multiplying a position gain Kp with the position error to the adder 104 as a velocity command value. The differentiator 1091 of the position feedforward calculation unit 109 differentiates the position command value and multiplies a differentiation result with a constant β, and the position feedforward processing unit 1092 performs a position feedforward process represented by a transfer function G(s) in Equation 1 (indicated by Math. 1 below) on the output of the differentiator 1091 and outputs the processing result to the adder 104 as a position feedforward term. Coefficients $a_i$ and $b_j$ (m≥i≥0, n≥j≥0) in Expression 1 are coefficients of the transfer function of the position feedforward processing unit 1092. m and n are natural numbers.

$$G(s) = \frac{b_0 + b_1 s + b_2 s^2 + \ldots + b_x s^n}{a_0 + a_1 s + a_2 s^2 + \ldots + a_x s^m} \quad [\text{Math. 1}]$$

The adder 104 adds the velocity command value and the output value (the position feedforward term) of the position feedforward calculation unit 109 and outputs an addition result to the subtractor 105 as a feedforward-controlled velocity command value. The subtractor 105 calculates a difference between the output of the adder 104 and a feedback velocity detection value and outputs the difference to the velocity control unit 106 as a velocity error.

The velocity control unit 106 adds a value obtained by multiplying and integrating an integral gain K1v with the velocity error and a value obtained by multiplying a proportional gain K2v with the velocity error and outputs an addition result to the adder 107 as a torque command value.

The double differentiator 1101 of the velocity feedforward calculation unit 110 differentiates the position command value two times and multiplies a differentiation result with a constant α, and the velocity feedforward processing unit 1102 performs a velocity feedforward process represented by a transfer function F(s) in Equation 2 (indicated by Math. 2 below) on the output of the double differentiator 1101 and outputs the processing result to the adder 107 as a velocity feedforward term. Coefficients $c_i$ and $d_j$(m≥i≥0, n≥j≥0) in Expression 2 are coefficients of the transfer function of the velocity feedforward processing unit 1102.
m and n are natural numbers. The natural numbers m and n in Equation 2 may be the same numbers as or different numbers from the natural numbers m and n in Equation 1.

$$F(s) = \frac{d_0 + d_1 s + d_2 s^2 + \ldots + d_x s^n}{c_0 + c_1 s + c_2 s + \ldots + c_x s^m} \quad [\text{Math. 2}]$$

The adder 107 adds the torque command value and an output value (the velocity feedforward term) of the velocity feedforward calculation unit 110 and outputs the addition result to the servo motor 300 as a feedforward-controlled torque command value to drive the servo motor 300.

A rotational angular position of the servo motor 300 is detected by a rotary encoder serving as a position detection unit associated with the servo motor 300, and a velocity detection value is input to the subtractor 105 as a velocity feedback. The velocity detection value is integrated by the integrator 108 to be a position detection value, and the position detection value is input to the subtractor 102 as a position feedback. The servo control device 100 is configured in this manner.

Figure 3:
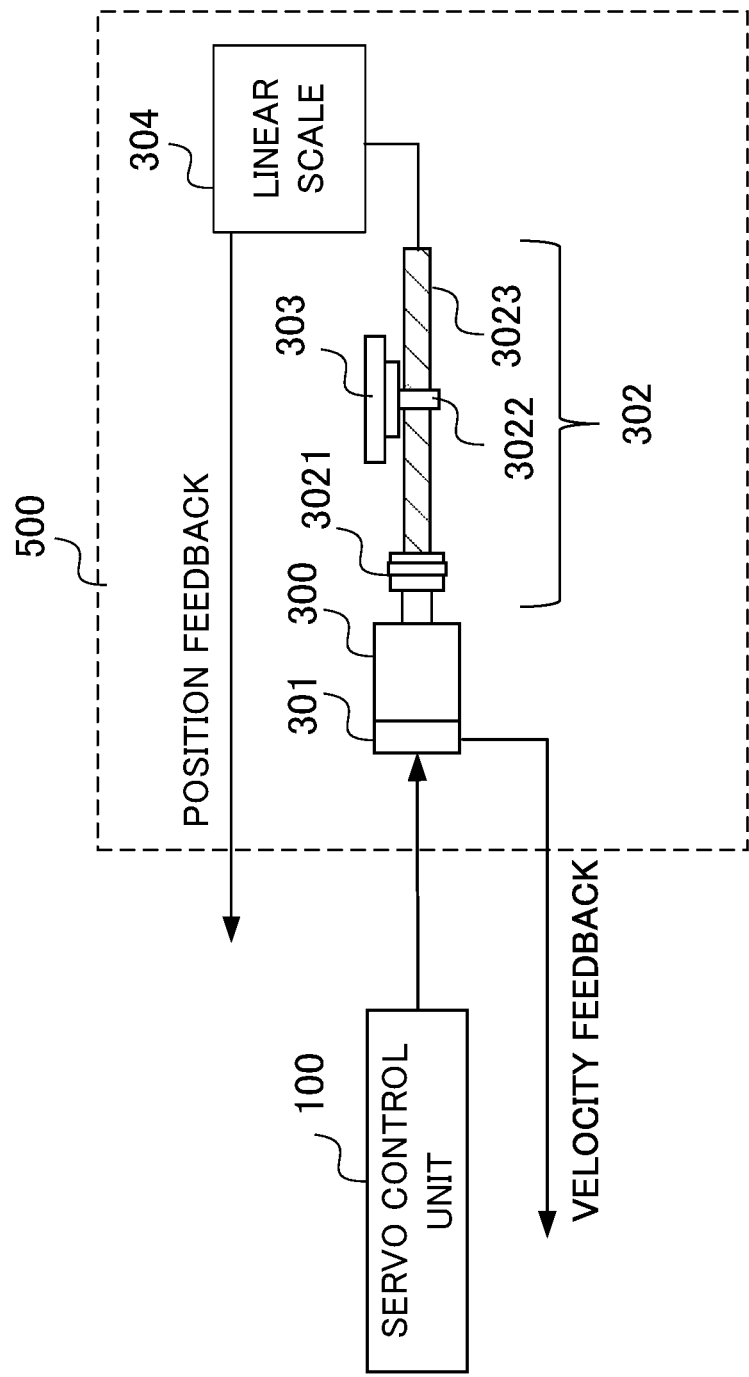
FIG. 3 is a block diagram illustrating a portion of a machine tool including a motor serving as an example of a control target of the servo control device.

Next, a control target 500 including the servo motor 300 controlled by the servo control device 100 will be described. FIG. 3 is a block diagram illustrating a portion of a machine tool including a motor, which is an example of the control target 500 of the servo control device 100. The servo control device 100 causes the servo motor 300 to move the table 303 with the aid of a coupling mechanism 302 to thereby machine a workpiece (a work) mounted on the table 303. The coupling mechanism 302 includes a coupling 3021 coupled to the servo motor 300 and a ball screw 3023 fixed to the coupling 3021, and a nut 3022 is screwed into the ball screw 3023. With rotation of the servo motor 300, the nut 3022 screwed into the ball screw 3023 moves in an axial direction of the ball screw 3023. With movement of the nut 3022, the table 303 moves.

A rotational angular position of the servo motor 300 is detected by the rotary encoder 301 serving as a position detection unit associated with the servo motor 300. As described above, the detected signal is used as a velocity feedback. The detected signal is integrated by the integrator 108 and is used as a position feedback. An output of a linear scale 304 attached to an end of the ball screw 3023 to detect a moving distance of the ball screw 3023 may be used as a position feedback. Moreover, a position feedback may be generated using an acceleration sensor.

<Machine Learning Device 200>

The machine learning device 200 performs machine learning (hereinafter referred to as learning) on a coefficient of a transfer function of the position feedforward processing unit 1092 and a coefficient of a transfer function of the velocity feedforward processing unit 1102, for example. As described above in connection with Patent Document 2, when learning on a position feedforward term and learning on a velocity feedforward term are performed simultaneously, the two learning operations interfere with each other, the amount of information processed for the learning of the coefficient of the position feedforward control and the learning of the coefficient of the velocity feedforward control increases. Therefore, in the present embodiment, the machine learning device 200 performs learning of the coefficient of the transfer function of the velocity feedforward calculation unit 110 separately from learning of the coefficient of the transfer function of the position feedforward calculation unit 109 and performs learning of the coefficient of the transfer function of the velocity feedforward calculation unit 110 on the inner side (the inner loop) than the position feedforward calculation unit 109 earlier than the learning of the coefficient of the transfer function of the position feedforward calculation unit 109. Specifically, the machine learning device 200 fixes the coefficient of the transfer function of the position feedforward processing unit 1092 of the position feedforward calculation unit 109 and learning the optimal value of the coefficient of the transfer function of the velocity feedforward processing unit 1102 of the velocity feedforward calculation unit 110. After that, the machine learning device 200 fixes the coefficient of the transfer function of the velocity feedforward processing unit 1102 to the optimal value obtained by learning and learns the coefficient of the transfer function of the position feedforward processing unit 1092.

The reason why the machine learning device 200 learns the coefficient of the transfer function of the velocity feedforward processing unit 1102 earlier than the coefficient of the transfer function of the position feedforward processing unit 1092 will be described with reference to FIG. 2. When seen from the servo motor 300, since a torque command is created using a velocity command, the torque command is a command on the inner side than the velocity command. Therefore, calculation of the velocity feedforward term included in the torque command is a process located on the inner side than the calculation of the position feedforward term included in the velocity command. Specifically, the output (the position feedforward term) of the position feedforward calculation unit 109 is input to the adder 104, and the output (the velocity feedforward term) of the velocity feedforward calculation unit 110 is input to the adder 107. The adder 104 is connected to the servo motor 300 via the subtractor 105, the velocity control unit 106, and the adder 107. If learning related to optimization of the coefficient of the transfer function of the position feedforward processing unit 1092 is earlier than the learning related to optimization of the coefficient of the transfer function of the velocity feedforward processing unit 1102, the velocity feedforward term is changed by the learning related to optimization of the coefficient of the transfer function of the velocity feedforward processing unit 1102 performed later. In order to suppress a position error sufficiently, the machine learning device 200 needs to perform learning related to optimization of the coefficient of the transfer function of the position feedforward processing unit 1092 again under the condition of the changed velocity feedforward term. In contrast, if the learning related to optimization of the coefficient of the transfer function of the velocity feedforward processing unit 1102 is earlier than the learning related to optimization of the coefficient of the transfer function of the position feedforward processing unit 1092, the machine learning device 200 can perform learning related to optimization of the coefficient of the transfer function of the position feedforward processing unit 1092 under the condition of the velocity feedforward term optimized by learning and a variation in the position error is suppressed. Therefore, the machine learning device 200 performs learning of the coefficient of the transfer function of the velocity feedforward processing unit 1102 on the inner side (the inner loop) than the position feedforward calculation unit 109 earlier than the learning of the coefficient of the transfer function of the position feedforward processing unit 1092. As a result, a variation in the position error is suppressed and high accuracy is achieved.

The machine learning device 200 learns the coefficient of the transfer function of the position feedforward processing unit 1092 of the position feedforward calculation unit 109 and the coefficient of the transfer function of the velocity feedforward processing unit 1102 of the velocity feedforward calculation unit 110 by executing a predetermined machining program (hereinafter also referred to as a "learning machining program"). Here, a machining shape designated by the learning machining program is an octagon or a shape in which the corners of an octagon are alternately replaced with arcs.

Figure 4:
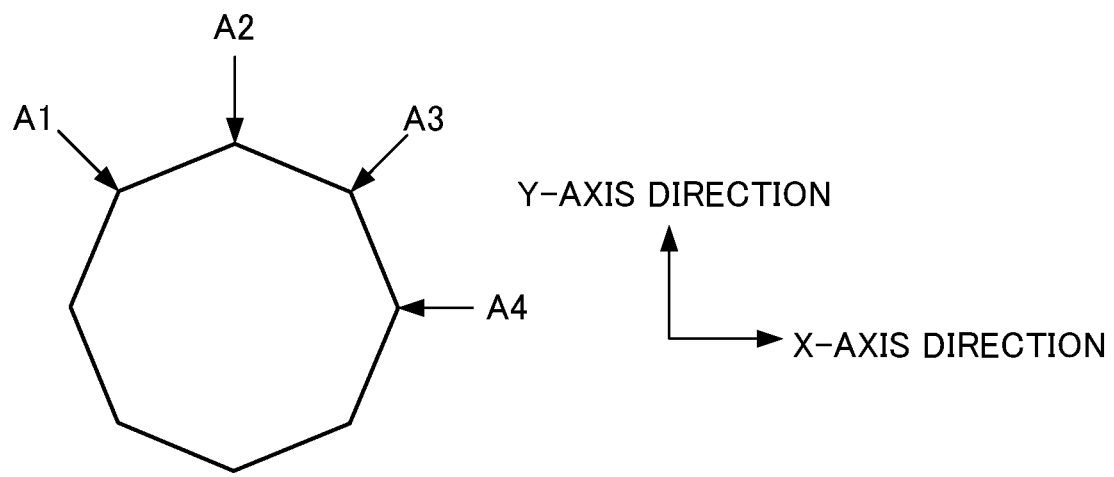
FIG. 4 is a diagram for describing an operation of a motor when a machining shape is an octagon.
Figure 5:
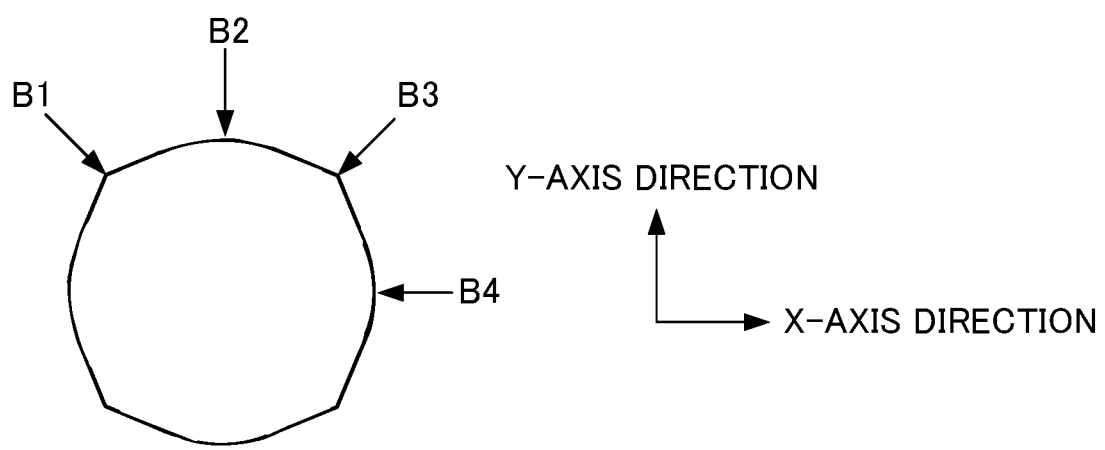
FIG. 5 is a diagram for describing an operation of a motor when a machining shape is a shape in which the corners of an octagon are alternately replaced with arcs.

FIG. 4 is a diagram for describing an operation of a motor when a machining shape is an octagon. FIG. 5 is a diagram for describing an operation of a motor when a machining shape is a shape in which the corners of an octagon are alternately replaced with arcs. In FIGS. 4 and 5, it is assumed that a table is moved in the X and Y-axis directions so that a workpiece (a work) is machined in the clockwise direction.

When the machining shape is an octagon, as illustrated in FIG. 4, the rotation velocity of a motor that moves the table in the Y-axis direction decreases at the corner position A1 whereas the rotation velocity of a motor that moves the table in the X-axis direction increases. A rotation direction of the motor that moves the table in the Y-axis direction is reversed at the corner position A2, and the table moves to be linearly reversed in the Y-axis direction. Moreover, the motor that moves the table in the X-axis direction rotates at an equal velocity in the same rotation direction from the position A1 to the position A2 and from the position A2 to the position A3. The rotation velocity of the motor that moves the table in the Y-axis direction increases at the corner position A3 whereas the rotation velocity of a motor that moves the table in the X-axis direction decreases. A rotation direction of the motor that moves the table in the X-axis direction is reversed at the corner position A4, and the table moves to be linearly reversed in the X-axis direction. Moreover, the motor that moves the table in the Y-axis direction rotates at an equal velocity in the same rotation direction from the position A3 to the position A4 and from the position A4 to the next corner position.

When the machining shape is a shape in which the corners of an octagon are alternately replaced with arcs, as illustrated in FIG. 5, the rotation velocity of a motor that moves the table in the Y-axis direction decreases at the corner position B1 whereas the rotation velocity of a motor that moves the table in the X-axis direction increases. A rotation direction of the motor that moves the table in the Y-axis direction is reversed at the corner position B2, and the table moves to be linearly reversed in the Y-axis direction. Moreover, the motor that moves the table in the X-axis direction rotates at an equal velocity in the same rotation direction from the position B1 to the position B3. Unlike the case in which the machining shape is an octagon illustrated in FIG. 4, the rotation velocity of the motor that moves the table in the Y-axis direction decreases gradually as it approaches the position B2, the rotation stops at the position B2, and the rotation velocity increases gradually as it departs from the position B2 so that a machining shape of an arc is formed before and after the position B2. The rotation velocity of the motor that moves the table in the Y-axis direction increases at the corner position B3 whereas the rotation velocity of a motor that moves the table in the X-axis direction decreases. A rotation direction of the motor that moves the table in the X-axis direction is reversed at the corner position B4, and the table moves to be linearly reversed in the X-axis direction. Moreover, the motor that moves the table in the Y-axis direction rotates at an equal velocity in the same rotation direction from the position B3 to the position B4 and from the position B4 to the next corner position. The rotation velocity of the motor that moves the table in the X-axis direction decreases gradually as it approaches the position B4, the rotation stops at the position B4, and the rotation velocity increases gradually as it departs from the position B4 so that a machining shape of an arc is formed before and after the position B4.

In the present embodiment, the machine learning device 200 performs machine learning of coefficients by evaluating vibration when a rotation velocity is changed during linear control at the positions A1 and A3 and the positions B1 and B3 of the machining shape designated by the learning machining program and examining the influence on a position error. Although not used in the present embodiment, the machine learning device 200 may evaluate coasting (running by inertia) occurring when a rotation direction is reversed at the positions A2 and A4 and the positions B2 and B4 of the machining shape and examine the influence of a position error.

Hereinafter, the machine learning device 200 will be described in further detail. In the following description, although a case in which the machine learning device 200 performs reinforcement learning is described, the learning performed by the machine learning device 200 is not particularly limited to reinforcement learning, but the present invention can be also applied to a case in which the machine learning device 200 performs supervised learning, for example.

Prior to description of respective functional blocks included in the machine learning device 200, first, a basic mechanism of reinforcement learning will be described. An agent (corresponding to the machine learning device 200 in the present embodiment) observes an environment state and selects a certain action. Then, the environment changes on the basis of the action. A certain reward is given according to the environmental change, and the agent learns selection (decision) for a better action. While supervised learning presents a complete correct answer, the reward in the reinforcement learning often presents a fragmental value based on change in a portion of the environment. Therefore, the agent learns to select an action so that the total reward in the future is maximized.

In this way, the reinforcement learning learns a method of learning a suitable action on the basis of the mutual effect of an action on the environment (that is, an action for maximizing the reward to be obtained in the future) by learning an action. This represents that, in the present embodiment, such an action that affects the future, for example, an action of selecting action information for reducing a position error, is obtained.

Here, although an arbitrary learning method is used as the reinforcement learning, in the description below, Q-learning which is a method of learning a value $Q(S,A)$ of selecting an action A under a certain environment state S will be described as an example. An object of the Q-learning is to select an action A having the highest value $Q(S,A)$ as an optimal action among actions A that can be taken in a certain state S.

However, at an initial time at which the Q-learning starts, the correct value of the value $Q(S,A)$ is not known at all for a combination of the state S and the action A. Therefore, the agent learns the correct value $Q(S,A)$ by selecting various actions A under a certain state S and selecting a better action on the basis of rewards given for the selected actions A.

Since it is desired to maximize a total reward obtained in the future, it is aimed to finally attain a relation of $Q(S,A) = E[\Sigma(\gamma^t)r_t]$. Here, $E[\ ]$ indicates an expected value, t indicates time, $\gamma$ is a parameter called a discount factor to be described later, $r_t$ is a reward at time t, and $\Sigma$ is the sum at time t. In this expression, the expected value is an expected value when the state was changed according to an optimal action. However, since it is unclear which action is optimal in the process of Q-learning, reinforcement learning is performed while searching for an optimal action by performing various actions. An update expression of such a value $Q(S,A)$ can be represented by Expression 3 below (Math. 3).

$$Q(S_{t+1}, A_{t+1}) \leftarrow Q(S_t, A_t) + \alpha\left(r_{t+1} + \gamma \max_A Q(S_{t+1}, A) - Q(S_t, A_t)\right)$$ [Math. 3]

In Expression 3, $S_t$ indicates an environment state at time t, and $A_t$ indicates an action at time t. By the action $A_t$, the state changes to $S_{t+1}$.

$r_{t+1}$ indicates a reward obtained by the change in the state. Moreover, a term with max is a multiplication of the Q value by $\gamma$ when an action A having the highest Q value known at that moment was selected under the state $S_{t+1}$. Here, $\gamma$ is a parameter of $0<\gamma\leq 1$ and is called a discount rate. Moreover, $\alpha$ is a learning coefficient and is in the range of $0<\alpha\leq 1$.

Expression 3 indicates a method of updating a value $Q(S_t,A_t)$ of an action $A_t$ in a state $S_t$ on the basis of a returning reward $r_{t+1}$ when the action $A_t$ is performed. This update expression indicates that if the value $\max a\, Q(S_{t+1},A)$ of the best action in the next state $S_{t+1}$ associated with an action $A_t$ is larger than the value $Q(S_t,A_t)$ of an action $A_t$ in the state $S_t$, $Q(S_t,A_t)$ is increased, and if otherwise, $Q(S_t,A_t)$ is decreased. That is, the value of a certain action in a certain state approaches the value of the best action in the next state associated with the action. However, although this difference between the values differs depending on the discount rate $\gamma$ and the reward $r_{t+1}$, the update equation has such a structure that the value of the best action in a certain state basically propagates to the value of an action in a state previous to that state.

Here, a Q-learning method of creating a value function $Q(S,A)$ table for all state-action pairs $(S,A)$ to perform learning is known. However, it may take a considerably long time for the Q-learning to settle when the values of the value functions $Q(S,A)$ of all state-action pairs are to be calculated since the number of states is too large.

Thus, Q-learning may use an existing technique called a deep Q-network (DQN). Specifically, an agent may calculate the value of the value $Q(S,A)$ by constructing a value function Q using an appropriate neural network and approximating the value function Q with the appropriate neural network by adjusting the processes of the neural network. By using DQN, it is possible to shorten the time required for settling of Q-learning. The details of DQN are disclosed in Non-Patent Document below, for example.

Non-Patent Document

"Human-level control through deep reinforcement learning", Volodymyr Mnihl [online], [searched on Jan. 17, 2017], Internet <URL: http://files.davidqiu.com/research/nature14236.pdf>

The machine learning device 200 performs the above-described Q-learning. Specifically, the machine learning device 200 learns a value function Q of selecting an action A of adjusting the values of the coefficients $a_i$ and $b_j$ of the transfer function of the position feedforward processing unit 1092 or the coefficients $c_i$ and $d_j$ of the transfer function of the velocity feedforward processing unit 1102, associated with a servo state S such as the values of the coefficients $a_i$ and $b_j$ (i and j≥0) of the transfer function of the position feedforward processing unit 1092 or the values of the coefficients $c_i$ and $d_j$ (i and j≥0) of the transfer function of the velocity feedforward processing unit 1102 of the servo control device 100, and commands, and feedbacks. The command includes a position command, the feedback includes position error information of the servo control device 100 acquired by executing the learning machining program. First, the machine learning device 200 learns the values of the coefficients $c_i$ and $d_j$ (i and j≥0) of the transfer function of the velocity feedforward processing unit 1102, and then, learns the values of the coefficients $a_i$ and $b_j$ (i and j≥0) of the transfer function of the position feedforward processing unit 1092. In the following description, although learning of the values of the coefficients $c_i$ and $d_j$ (i and j≥0) of the transfer function of the velocity feedforward processing unit 1102 is described, the learning of the values of the coefficients $a_i$ and $b_j$ (i and j≥0) of the transfer function of the position feedforward processing unit 1092 is performed in a similar manner.

The machine learning device 200 observes the state information S including a servo state such as commands and feedbacks including the position command and the position error information of the servo control device 100 at the positions A1 and A3 and the positions B1 and B3 of the machining shape by executing the learning machining program on the basis of the coefficients $c_i$ and $d_j$ of the transfer function of the velocity feedforward processing unit 1102 to determine the action A. The machine learning device 200 returns a reward whenever the action A is executed. The machine learning device 200 searches for the optimal action A so that a total future reward is maximized by trial-and-error learning. By doing so, the machine learning device 200 can select an optimal action A (that is, the optimal coefficients $c_i$ and $d_j$ of the velocity feedforward processing unit 1102) with respect to the state S including the servo state such as commands and feedbacks including the position command and the position error information of the servo control device 100 acquired by executing the learning machining program on the basis of the coefficients $c_i$ and $d_j$ of the transfer function of the velocity feedforward processing unit 1102. The rotation direction of the servo motor in the X-axis direction and the Y-axis direction does not change at the positions A1 and A3 and the positions B1 and B3, and the machine learning device 200 can learn the coefficients $c_i$ and $d_j$ of the transfer function of the velocity feedforward processing unit 1102 during linear operation.

That is, the machine learning device 200 can select such an action A (that is, the coefficients $c_i$ and $d_j$ of the velocity feedforward processing unit 1102) that minimizes the position error acquired by executing the learning machining program by selecting such an action A that maximizes the value of Q among the actions A applied to the coefficients $c_i$ and $d_j$ of the transfer function of the velocity feedforward calculation unit 110 related to a certain state S on the basis of the learnt value function Q.

Figure 6:
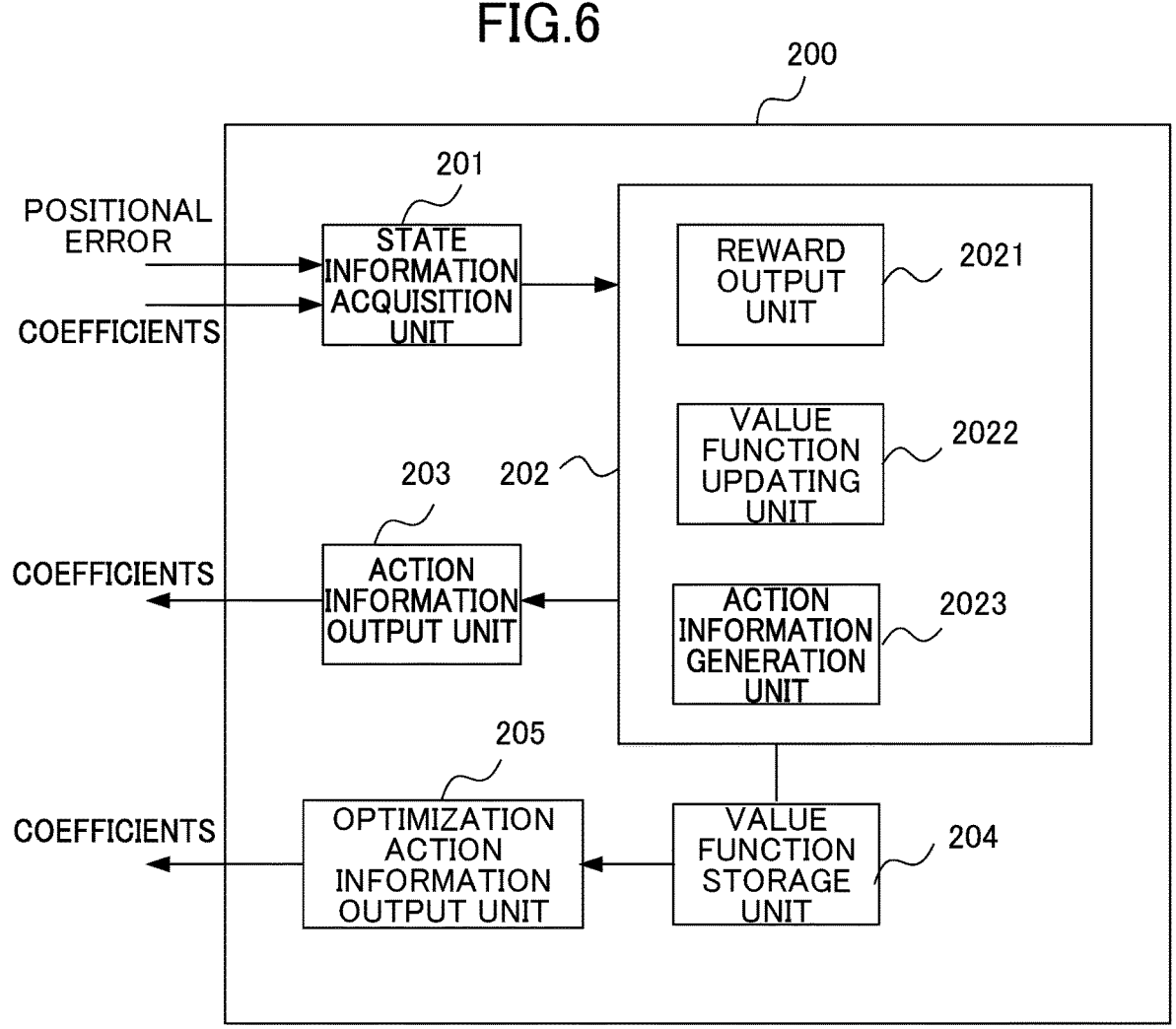
FIG. 6 is a block diagram illustrating a machine learning device according to the first embodiment.

FIG. 6 is a block diagram illustrating the machine learning device 200 according to the first embodiment of the present invention. As illustrated in FIG. 6, in order to perform the reinforcement learning, the machine learning device 200 includes a state information acquisition unit 201, a learning unit 202, an action information output unit 203, a value function storage unit 204, and an optimization action information output unit 205. The learning unit 202 includes a reward output unit 2021, a value function updating unit 2022, and an action information generation unit 2023.

The state information acquisition unit 201 acquires, from the servo control device 100, the state S including a servo state such as commands and feedbacks including the position command and the position error information of the servo control device 100 acquired by executing the learning machining program on the basis of the coefficients $c_i$ and $d_j$ of the transfer function of the velocity feedforward processing unit 1102 of the servo control device 100. The state information S corresponds to an environment state S in the Q-learning. The state information acquisition unit 201 outputs the acquired state information S to the learning unit 202.

The coefficients $c_i$ and $d_j$ of the velocity feedforward calculation unit 110 at a time point at which the Q-learning starts initially are generated by a user in advance. In the present embodiment, the initial setting values of the coefficients $c_i$ and $d_j$ of the velocity feedforward processing unit 1102 created by the user are adjusted to optimal values by the reinforcement learning. The coefficient α of the double differentiator 1101 of the velocity feedforward calculation unit 110 is set to a fixed value (for example, α=1). The initial setting values of the coefficients $c_i$ and $d_j$ of the velocity feedforward processing unit 1102 in Equation 2 are set such that $c_0=1$, $C_1=0$, $c_2=0$, . . . and $c_m=0$, and $d_0=1$, $d_1=0$, $d_2=0$, . . . , and $d_n=0$. The dimensions m and n of the coefficients $c_i$ and $d_j$ are set in advance. That is, $0 \le i \le m$ for $c_i$, and $0 \le j \le n$ for $d_j$. The coefficient $\beta$ of the differentiator 1091 of the position feedforward calculation unit 109 is set to a fixed value (for example, $\beta=1$). The initial setting values of the coefficients $a_i$ and $b_j$ of the position feedforward processing unit 1092 in Equation 1 are set such that $a_0=1$, $a_1=0, a_2=0, \ldots, a_m=0$, and $b_0=1$, $b_1=0, b_2=0, \ldots,$ and $b_n=0$. The dimensions m and n of the coefficients $a_i$ and $b_j$ are set in advance. That is, $0 \le i \le m$ for $a_i$, and $0 \le j \le n$ for $b_j$. The same values as the initial setting values of the coefficients $c_i$ and $d_j$ of the transfer function of the velocity feedforward processing unit 1102 may be applied to the initial setting values of the coefficients $a_i$ and $b_j$. When a machine tool is adjusted by an operator, machine learning may be performed using the adjusted values as the initial values of the coefficients $a_i$ and $b_j$ and the coefficients $c_i$ and $d_j$.

The learning unit 202 is a unit that learns the value Q(S,A) when a certain action A is selected under a certain environment state S.

The reward output unit 2021 is a unit that calculates a reward when the action A is selected under a certain state S. Here, a set (a position error set) of position errors which are state variables of the state S will be denoted by PD(S), and a position error set which is state variables related to state information S' changed from the state S due to the action information A (correction of the coefficients $c_i$ and $d_j$ (i and j are 0 or positive integers) of the velocity feedforward processing unit 1102) will be denoted by PD(S'). Moreover, the evaluation function value of the position error in the state S is a value calculated on the basis of a predetermined evaluation function f(PD(S)). When e is a position error, the following functions can be used as the evaluation function f, for example. A function that calculates an integrated value of an absolute value of a position error $$\int |e| dt$$

A function that calculates an integrated value by a weighting an absolute value of a position error with time $$\int t|e| dt$$

A function that calculates an integrated value of a 2n-th power (n is a natural number) of an absolute value of a position error $$\int e^{2n} dt \text{ (n is a natural number)}$$

A function that calculates a maximum value of an absolute value of a position error $$\text{Max}\{|e|\}$$

f(PD(S')) is an evaluation function value of the position error of the servo control device 100 operated on the basis of the velocity feedforward calculation unit 110 after correction related to the state information S' compensated by the action information A, and f(PD(S)) is an evaluation function value of the position error of the servo control device 100 operated on the basis of the velocity feedforward calculation unit 110 before correction related to the state information S before being compensated by the action information A. In this case, the reward output unit 2021 sets the value of a reward to a negative value when the evaluation function value f(PD(S')) is larger than the evaluation function value f(PD(S)).

On the other hand, the reward output unit 2021 sets the value of a reward to a positive value when the evaluation function value f(PD(S')) is smaller than the evaluation function value f(PD(S)). The reward output unit 2021 sets the value of a reward to zero when the evaluation function value f(PD(S')) is equal to the evaluation function value f(PD(S)).

Furthermore, the reward output unit 2021 may increase the negative value according to a proportion when the evaluation function value f(PD(S')) of the position error in the state S' after execution of the action A is larger than the evaluation function value f(PD(S)) of the position error in the previous state S. That is, the negative value may increase according to the degree of increase in the evaluation function value of the position error. In contrast, the reward output unit 2021 may decrease the positive value according to a proportion when the evaluation function value f(PD(S')) of the position error in the state S' after execution of the action A is smaller than the evaluation function value f(PD(S)) of the position error in the previous state S. That is, the positive value may increase according to the degree of decrease in the evaluation function value of the position error.

The value function updating unit 2022 updates the value function Q stored in the value function storage unit 204 by performing Q-learning on the basis of the state S, the action A, the state S' when the action A was applied to the state S, and the value of the reward calculated in this manner. The update of the value function Q may be performed by online learning, batch learning, or mini-batch learning. Online learning is a learning method of applying a certain action A to a present state S and updating the value function Q immediately whenever the present state S transitions to a new state S'. Batch learning is a learning method of applying a certain action A to a present state S and repeated attaining transition from the state S to a new state S', collecting learning data, and updating the value function Q using all the collected learning data. Mini-batch learning is a learning method which is intermediate between online learning and batch learning and involves updating the value function Q whenever a certain amount of learning data is collected.

The action information generating unit 2023 selects the action A in the process of Q-learning with respect to the present state S. The action information generation unit 2023 generates action information A and outputs the generated action information A to the action information output unit 203 in order to perform an operation (corresponding to the action A of Q-learning) of correcting the coefficients $c_i$ and $d_j$ of the velocity feedforward processing unit 1102 of the servo control device 100 in the process of Q-learning. More specifically, the action information generation unit 2023 adds or subtracts the coefficients $c_i$ and $d_j$ of the velocity feedforward processing unit 1102 included in the action A incrementally (for example, with a step of approximately 0.01) with respect to the coefficients of the velocity feedforward calculation unit included in the state S, for example.

When the coefficients $c_i$ and $d_j$ of the velocity feedforward processing unit 1102 are increased or decreased, the state S transitions to the state S', and a plus reward (a positive reward) is returned, the action information generation unit 2023 may select a policy of selecting such an action A' that further decreases the value of the position error such as incrementally increasing or decreasing the coefficients $c_i$ and $d_j$ of the velocity feedforward processing unit 1102 similarly to the previous action as the next action A'.

In contrast, when a minus reward (a negative reward) is returned, the action information generation unit 2023 may select a policy of selecting such an action A' that decreases the position error to be smaller than the previous value such as incrementally decreasing or increasing the coefficients $c_i$ and $d_j$ of the velocity feedforward calculation unit contrarily to the previous action as the next action A', for example.

The action information generation unit 2023 may select a policy of selecting the action A' according to a known method such as a greedy method of selecting an action A' having the highest value Q(S,A) among the values of presently estimated actions A and an e-greedy method of randomly selecting an action A' with a certain small probability E and selecting an action A' having the highest value Q(S,A) in other cases.

The action information output unit 203 is a unit that transmits the action information A output from the learning unit 202 to the servo control device 100. As described above, the servo control device 100 finely adjusts the present state S (that is, the presently set coefficients $c_i$ and $d_j$ of the velocity feedforward processing unit 1102) on the basis of the action information to thereby transition to the next state S' (that is, the compensated coefficients of the velocity feedforward processing unit 1102).

The value function storage unit 204 is a storage device that stores the value function Q. The value function Q may be stored as a table (hereinafter referred to as an action value table) for each sate S and each action A, for example. The value function Q stored in the value function storage unit 204 is updated by the value function updating unit 2022. Moreover, the value function Q stored in the value function storage unit 204 may be shared with other machine learning devices 200. When the value function Q is shared by a plurality of machine learning devices 200, since reinforcement learning can be performed in a manner of being distributed to the respective machine learning devices 200, it is possible to improve the reinforcement learning efficiency.

The optimization action information output unit 205 generates the action information A (hereinafter referred to as "optimization action information") for causing the velocity feedforward calculation unit 110 to perform an operation of maximizing the value Q(S,A) on the basis of the value function Q updated by the value function updating unit 2022 performing the Q-learning. More specifically, the optimization action information output unit 205 acquires the value function Q stored in the value function storage unit 204. As described above, the value function Q is updated by the value function updating unit 2022 performing the Q-learning. The optimization action information output unit 205 generates the action information on the basis of the value function Q and outputs the generated action information to the servo control device 100 (the velocity feedforward processing unit 1102 of the velocity feedforward calculation unit 110). The optimization action information includes information that corrects the coefficients $c_i$ and $d_j$ of the velocity feedforward processing unit 1102 similarly to the action information that the action information output unit 203 outputs in the process of Q-learning.

In the servo control device 100, the coefficients $c_i$ and $d_j$ of the velocity feedforward processing unit 1102 are compensated on the basis of the action information. With the above-described operations, the machine learning device 200 can perform learning and optimization of the coefficients $a_i$ and $b_j$ of the position feedforward processing unit 1092 similarly to the learning and the optimization of the coefficients of the velocity feedforward processing unit 1102 after performing optimization of the coefficients $c_i$ and $d_j$ of the velocity feedforward processing unit 1102 and operate so as to reduce the position error value. As described above, by using the machine learning device 200 according to the present embodiment, it is possible to simplify the adjustment of parameters of the velocity feedforward calculation unit 110 and the position feedforward calculation unit 109 of the servo control device 100.

The present inventors performed optimization of the coefficients $c_i$ and $d_j$ of the velocity feedforward processing unit 1102 using the machine learning device 200 which uses reinforcement learning and uses an octagon as a machining shape designated by a learning machining program and performed optimization of the coefficients $a_i$ and $b_j$ of the position feedforward processing unit 1092 and examined a variation range of the position error. Moreover, for comparison, the present inventors performed optimization of the coefficients $a_i$ and $b_j$ of the position feedforward processing unit 1092 using the machine learning device 200 which uses reinforcement learning and uses an octagon as a machining shape designated by a learning machining program and performed optimization of the coefficients $c_i$ and $d_j$ of the velocity feedforward processing unit 1102 and examined a variation range of the position error. The result showed that the settling time of the machine learning was shortened, the variation in the position error was suppressed more, and higher accuracy was achieved when optimization of the coefficients $a_i$ and $b_j$ of the position feedforward processing unit 1092 was performed after optimization of the coefficients $c_i$ and $d_j$ of the velocity feedforward processing unit 1102 was performed.

Hereinabove, the functional blocks included in the servo control device 100 and the machine learning device 200 have been described. In order to realize these functional blocks, the servo control device 100 and the machine learning device 200 each include an arithmetic processing unit such as a central processing unit (CPU). The servo control device 100 and the machine learning device 200 each further include an auxiliary storage device such as a hard disk drive (HDD) for storing various control programs such as application software or an operating system (OS) and a main storage device such as a random access memory (RAM) for storing data temporarily required when the arithmetic processing device executes a program.

In each of the servo control device 100 and the machine learning device 200, the arithmetic processing device reads an application or an OS from the auxiliary storage device, and develops the read application software or OS in the main storage device to perform arithmetic processing on the basis of the read application software or OS. The arithmetic processing device also controls various types of hardware provided in each device based on the arithmetic result. In this way, the functional blocks of the present embodiment are realized. That is, the present embodiment can be realized by cooperation of hardware and software.

Since the machine learning device 200 involves a large amount of computation associated with the machine learning, graphics processing units (GPUs) may be mounted on a personal computer and be used for arithmetic processing associated with the machine learning using a technique called general-purpose computing on graphics processing units (GPGPUs). In this way, high velocity processing can be performed. Furthermore, in order for the machine learning device 200 to perform higher velocity processing, a computer cluster may be built using a plurality of computers equipped with such GPUs, and the plurality of computers included in the computer cluster may perform parallel processing.

Figure 7:
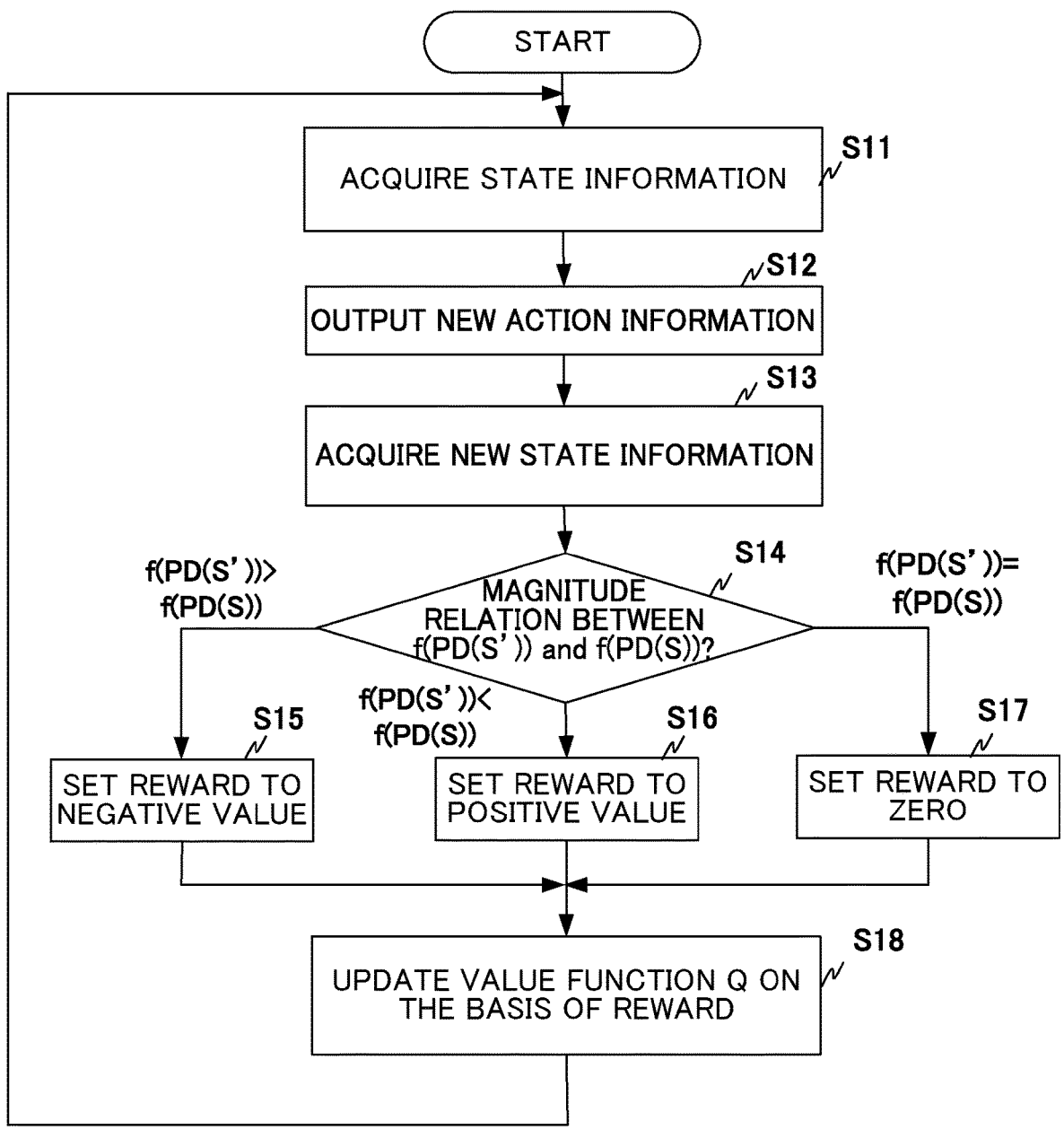
FIG. 7 is a flowchart for describing an operation of the machine learning device according to the first embodiment.

Next, an operation of the machine learning device 200 during Q-learning according to the present embodiment will be described with reference to the flowcharts of FIG. 7.

In step S11, the state information acquisition unit 201 acquires the state information S from the servo control device 100. The acquired state information is output to the value function updating unit 2022 and the action information generation unit 2023. As described above, the state information S is information corresponding to the state of Q-learning and includes the coefficients $c_i$ and $d_j$ of the velocity feedforward processing unit 1102 at the time point of step S11. In this way, the state information acquisition unit 201 acquires a position error set PD(S) corresponding to a predetermined feed rate and a machining shape of a circle when the coefficients from the velocity feedforward calculation unit 110 are initial values.

As described above, the coefficients $c_i$ and $d_j$ of the velocity feedforward processing unit 1102 in the initial state $S_0$ are set such that $c_0=1$, $C_1=0$, $c_2=0, \ldots$, and $c_m=0$, and $d_0=0$, $d_1=0$, $d_2=0, \ldots$, and $d_n=0$, for example.

The position error value $PD(S_0)$ in the state $S_0$ from the subtractor 102 at a time point at which Q-learning starts initially is obtained by operating the servo control device 100 according to a learning machining program. The position command creation unit 101 outputs position commands sequentially according to a predetermined machining shape (for example, a machining shape of an octagon) designated by the machining program. For example, a position command value corresponding to the machining shape of an octagon is output from the position command creation unit 101, and the position command value is output to the subtractor 102, the position feedforward calculation unit 109, the velocity feedforward calculation unit 110, and the machine learning device 200. The subtractor 102 outputs a difference between the position command value and the detection position output from the integrator 108 at the positions A1 and A3 and the positions B1 and B3 of the machining shape to the machine learning device 200 as the position error $PD(S_0)$. In the machine learning device 200, the difference between the position command value and the detection position output from the integrator 108 at the positions A2 and A4 and the positions B2 and B4 of the machining shape may be extracted as the position error $PD(S_0)$.

In step S12, the action information generation unit 2023 generates new action information A and outputs the generated new action information A to the servo control device 100 via the action information output unit 203. The action information generation unit 2023 outputs the new action information A on the basis of the above-described policy. The servo control device 100 having received the action information A drives a machine tool including the servo motor 300 according to the state S' obtained by correcting the coefficients $c_i$ and $d_j$ of the velocity feedforward processing unit 1102 associated with the present state S on the basis of the received action information. As described above, the action information corresponds to the action A in Q-learning.

In step S13, the state information acquisition unit 201 acquires the position error PD(S') in the new state S' from the subtractor 102 and acquires the coefficients $c_i$ and $d_j$ from the velocity feedforward processing unit 1102. In this way, the state information acquisition unit 201 acquires the position error set PD(S') corresponding to the machining shape of an octagon (specifically, the positions A1 and A3 and the positions B1 and B3 of the machining shape) and the coefficients $c_i$ and $d_j$ in the state S' from the velocity feedforward processing unit 1102. The acquired state information is output to the reward output unit 2021.

In step S14, the reward output unit 2021 determines a magnitude relation between the evaluation function value f(PD(S')) of the position error in the state S' and the evaluation function value f(PD(S)) of the position error in the state S and sets the reward to a negative value in step S15 when f(PD(S'))>f(PD(S)). When f(PD(S'))<f(PD(S)), the reward output unit 2021 sets the reward to a positive value in step S16. When f(PD(S'))=f(PD(S)), the reward output unit 2021 sets the reward to zero in step S17. The reward output unit 2021 may apply a weighting to the negative and positive reward values.

When any one of steps S15, S16, and S17 ends, the value function updating unit 2022 updates the value function Q stored in the value function storage unit 204 on the basis of the value of the reward calculated in any one of the steps in step S18. After that, the flow returns to step S11 again, and the above-described process is repeated, whereby the value function Q settles to an appropriate value. The process may end on condition that the above-described process is repeated for a predetermined period. Although online updating is exemplified in step S18, batch updating or mini-batch updating may be performed instead of the online updating.

In the present embodiment, due to the operation described with reference to FIG. 7, the machine learning device 200 provides advantages that it is possible to obtain an appropriate value function for adjustment of the coefficients $c_i$ and $d_j$ of the velocity feedforward processing unit 1102 and to simplify optimization of the coefficients $c_i$ and $d_j$ of the velocity feedforward processing unit 1102. Next, an operation during generation of the optimization action information by the optimization action information output unit 205 will be described with reference to the flowchart of FIG. 8. First, in step S21, the optimization action information output unit 205 acquires the value function Q stored in the value function storage unit 204. As described above, the value function Q is updated by the value function updating unit 2022 performing the Q-learning.

In step S22, the optimization action information output unit 205 generates the optimization action information on the basis of the value function Q and outputs the generated optimization action information to the velocity feedforward processing unit 1102 of the servo control device 100. The machine learning device 200 optimizes the coefficients $c_i$ and $d_j$ of the velocity feedforward processing unit 1102 with the above-described operations and then performs learning and optimization of the coefficients $a_i$ and $b_j$ of the position feedforward processing unit 1092 with similar operations.

Figure 8:
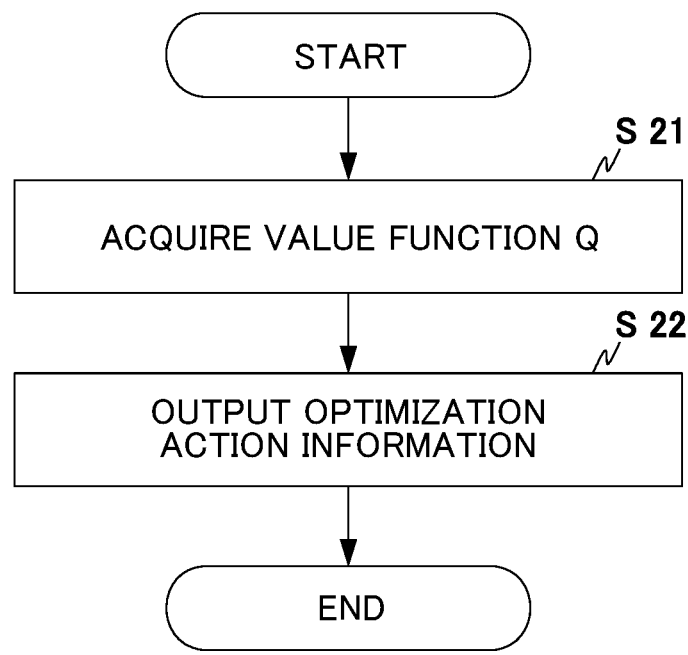
FIG. 8 is a flowchart for describing an operation of an optimization action information output unit of the machine learning device according to the first embodiment.

In the present embodiment, due to the operations described with reference to FIG. 8, the machine learning device 200 generates the optimization action information on the basis of the value function Q obtained by learning, and the servo control device 100 can simplify the adjustment of the presently set coefficients $c_i$ and $d_j$ of the velocity feedforward processing unit 1102 on the basis of the optimization action information and reduce the position error value. Moreover, the coefficients of the velocity feedforward processing unit 1102 are set to the initial values for higher dimensions, and the machine learning device 200 performs learning whereby the position error value can be reduced further. As for adjustment of the coefficients $a_i$ and $b_j$ of the position feedforward processing unit 1092, the position error value can be reduced similarly to adjustment of the coefficients $c_i$ and $d_j$ of the velocity feedforward processing unit 1102.

In the first embodiment, the reward output unit 2021 calculated the reward value by comparing the evaluation function value f(PD(S)) of the position error in the state S calculated on the basis of the predetermined evaluation function f(PD(S)) using the position error PD(S) in the state S as an input with the evaluation function value f(PD(S')) of the position error in the state S' calculated on the basis of the evaluation function f(PD(S')) using the position error PD(S') in the state S' as an input. However, the reward output unit 2021 may add another element other than the position error when calculating the reward value. For example, the machine learning device 200 may add at least one of a position-feedforward-controlled velocity command output from the adder 104, a difference between a velocity feedback and a position-feedforward-controlled velocity command, and a position-feedforward-controlled torque command output from the adder 107 in addition to the position error output from the subtractor 102.

Second Embodiment

In the first embodiment, a machine learning device of a servo control device including the position feedforward calculation unit 109 and the velocity feedforward calculation unit 110 has been described. In the present embodiment, a machine learning device of a servo control device including a current feedforward calculation unit in addition to the position feedforward calculation unit and the velocity feedforward calculation unit will be described.

Figure 9:
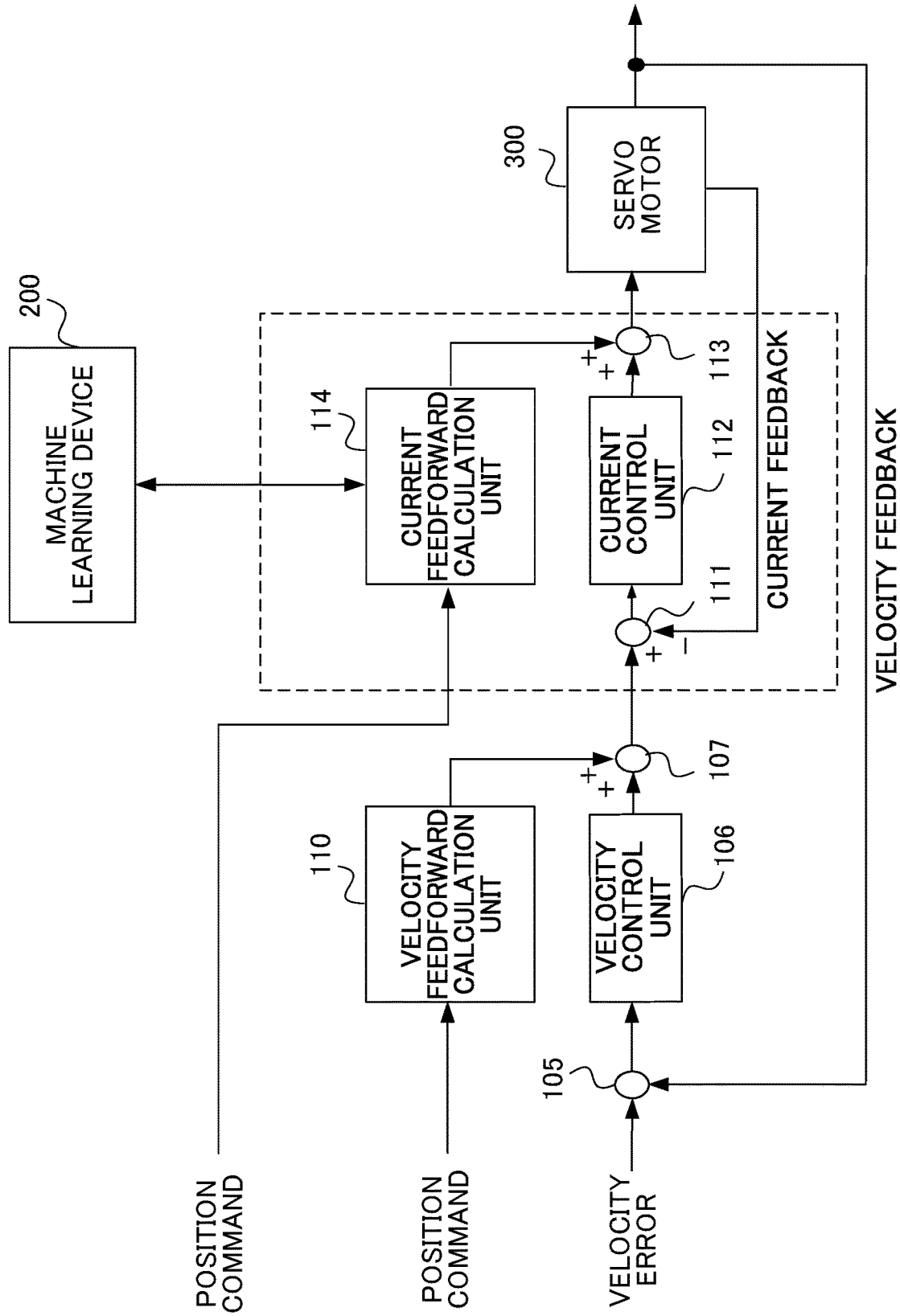
FIG. 9 is a block diagram illustrating a portion of a servo control device according to a second embodiment of the present invention.

FIG. 9 is a block diagram illustrating a portion of a servo control device according to the present embodiment. As illustrated in FIG. 9, the servo control device of the present embodiment further includes a subtractor 111, a current control unit 112, an adder 113, and a current feedforward calculation unit 114 indicated by a broken-line region in FIG. 9 in addition to the components of the servo control device 100 illustrated in FIG. 1. The subtractor 111 calculates a difference between a velocity-feedforward-controlled torque command value output from the adder 107 and a feedback current detection value and outputs the difference to the current control unit 112 as a current error. The current control unit 112 calculates a current command value on the basis of the current error and outputs the current command value to the adder 113. The current feedforward calculation unit 114 calculates a current command value on the basis of the position command value and outputs the current command value to the adder 113. The adder 113 adds the current command value and the output value of the current feedforward calculation unit 114, outputs the addition value to the servo motor 300 as a feedforward-controlled current command value, and drives the servo motor 300. The machine learning device 200 learns the coefficients of the transfer function of the current feedforward calculation unit 114 similarly to the coefficients $c_i$ and $d_j$ of the velocity feedforward processing unit 1102.

In the present embodiment, when seen from the servo motor 300, the current command is a command on the inner side than the torque command, and the torque command is a command on the inner side than the velocity command. When seen from the servo motor 300, the current feedforward control, the velocity feedforward control, and the position feedforward control are disposed in that order from the inner side toward the outer side. Therefore, similarly to the first embodiment, it is preferable that learning related to optimization of the coefficients of the velocity feedforward calculation unit is performed earlier than learning related to optimization of the coefficients of the position feedforward calculation unit. Furthermore, since the current feedforward control is disposed on the inner side than the velocity feedforward control, it is preferable that learning related to optimization of the coefficients of the current feedforward calculation unit is performed earlier than learning related to optimization of the coefficients of the velocity feedforward calculation unit. However, if the current feedforward control has a little influence on the position error, the machine learning device 200 may perform learning related to optimization of the coefficients of the velocity feedforward calculation unit and perform machine learning related to optimization of the coefficients of the current feed forward calculation unit and then perform learning related to optimization of the coefficients of the position feedforward calculation unit. This case is an example of a case in which learning related to the velocity feedforward control is performed earlier than learning related to the position feedforward control.

In the embodiment described above, the machine learning device 200 has been described as performing learning related to optimization of the coefficients of the position feedforward calculation unit and the velocity feedforward calculation unit during linear operation where the rotation direction of the servo motor in the X-axis direction and the Y-axis direction is not changed and learning related to optimization of the coefficients of the position feedforward calculation unit, the velocity feedforward calculation unit, and the current feedforward calculation unit. However, the present invention is not limited to learning during linear operation but can be applied to learning during a nonlinear operation. For example, when the machine learning device 200 performs learning related to optimization of the coefficients of the position feedforward calculation unit and the velocity feedforward calculation unit or learning related to optimization of the position feedforward calculation unit, the velocity feedforward calculation unit, and the current feedforward calculation unit, and learning related to optimization of the coefficients of the feedforward calculation unit in order to correct a backlash, the machine learning device 200 may extract a difference between the position command value and the detection position output from the integrator 108 at the positions A2 and A4 and the positions B2 and B4 of the machining shape as a position error and may perform reinforcement learning by giving a reward using the position error as determination information. At the positions A2 and A4 and the positions B2 and B4, the rotation direction of the servo motor in the Y-axis direction or the X-axis direction is reversed whereby a nonlinear operation is performed and a backlash occurs. In this case, the machine learning device can perform learning of the coefficients of the transfer function of the feedforward processing unit.

The servo control unit of the servo control device described above and the components included in the machine learning device may be realized by hardware, software or a combination thereof. The servo control method performed by cooperation of the components included in the servo control device described above also may be realized by hardware, software, or a combination thereof. Here, being realized by software means being realized when a computer reads and executes a program.

The programs can be stored on any of various types of non-transitory computer readable media and be provided to a computer. The non-transitory computer readable media include various types of tangible storage media. Examples of the non-transitory computer readable media include a magnetic recording medium (for example a flexible disk and a hard disk drive), a magneto-optical recording medium (for example a magneto-optical disk), a CD-ROM (Read Only Memory), a CD-R, a CD-R/W, a semiconductor memory (for example a mask ROM, a PROM (Programmable ROM), an EPROM (Erasable PROM), a flash ROM, and a RAM (Random Access Memory)). Moreover, the programs may be supplied to a computer via various types of transitory computer readable media.

The above-described embodiment is a preferred embodiment of the present invention. However, the scope of the present invention is not limited to the embodiment only but the present invention can be embodied in various modifications without departing from the spirit of the present invention.

<Modification in which Servo Control Device Includes Machine Learning Device>

Although the machine learning device 200 is configured as a device separate from the servo control device 100 in the above-described embodiments, some or all of the functions of the machine learning device 200 may be realized by the servo control device 100.

<Freedom in System Configuration>

In the embodiment described above, the machine learning device 200 and the servo control device 100 are communicably connected as a one-to-one correlation. However, for example, one machine learning device 200 and a plurality of servo control devices 100 may be communicably connected via the network 400 and the machine learning of each of the servo control devices 100 may be performed. In this case, a distributed processing system may be adopted, in which respective functions of the machine learning device 200 are distributed to a plurality of servers as appropriate. The functions of the machine learning device 200 may be realized by utilizing a virtual server function, or the like, in a cloud. When there are a plurality of machine learning devices 200-1 to 200-$n$ corresponding to a plurality of servo control devices 100-1 to 100-$n$, respectively, of the same type name, the same specification, or the same series, the machine learning devices 200-1 to 200-$n$ may be configured to share learning results in the machine learning devices 200-1 to 200-$n$. By doing so, a more optimal model can be constructed.

EXPLANATION OF REFERENCE NUMERALS

10: Servo control system
100: Servo control device
101: Position command creation unit
102: Subtractor
103: Position control unit
104: Adder
105: Subtractor
106: Velocity control unit
107: Adder
108: Integrator
109: Position feedforward calculation unit
110: Velocity feedforward calculation unit
200: Machine learning device
201: State information acquisition unit
202: Learning unit
203: Action information output unit
204: Value function storage unit
205: Optimization action information output unit
300: Motor
400: Network

What is claimed is:

1. A machine learning device configured to perform machine learning related to optimization of coefficients of at least two feedforward calculation units with respect to a servo control device configured to control a servo motor configured to drive a shaft of a machine tool or an industrial machine using feedforward control in which the at least two feedforward calculation units form compensators for multiple loops of the servo control device, the machine learning device comprising:

a memory storing a learning machining program; and a processor configured to execute the learning machining program to:

perform machine learning related to optimization of the coefficients of a first feedforward calculation unit among the at least two feedforward calculation units; and after the machine learning related to optimization of the coefficients of the first feedforward calculation unit is performed, perform machine learning related to optimization of the coefficients of a second feedforward calculation unit among the at least two feedforward calculation units based on the optimized coefficients of the first feedforward calculation unit obtained by the machine learning, wherein a first command is compensated by a feedforward term calculated by the first feedforward calculation unit, and the first command is a command on an inner side of the multiple loops of the servo control device, and wherein a second command is compensated by a feedforward term calculated by the second feedforward calculation unit, and the second command is a command on an outer side of the multiple loops of the servo control device.

2. The machine learning device according to claim 1, wherein:

the first feedforward calculation unit is a velocity feedforward calculation unit, and the first command is a torque command, and the second feedforward calculation unit is a position feedforward calculation unit, and the second command is a velocity command.

3. The machine learning device according to claim 2, wherein:

the position feedforward calculation unit is configured to calculate a position feedforward term for compensating the velocity command based on a position command and the optimized coefficients of the position feedforward calculation unit obtained by the machine learning, and the velocity feedforward calculation unit is configured to calculate a velocity feedforward term for compensating the torque command based on the position command and the optimized coefficients of the velocity feedforward calculation unit obtained by the machine learning, and the servo motor is driven according to the torque command compensated by the velocity feedforward term.

4. The machine learning device according to claim 3, wherein the processor is further configured to execute the learning machining program to:

perform machine learning related to optimization of the coefficients of a third feedforward calculation unit among the at least two feedforward calculation units; and after the machine learning related to optimization of the coefficients of the third feedforward calculation unit is performed, perform the machine learning related to optimization of the coefficients of the first feedforward calculation unit based on the optimized coefficients of the third feedforward calculation unit obtained by the machine learning, wherein a third command is compensated by a feedforward term calculated by the third feedforward calculation unit, and the third command is a command on an innermost side of the multiple loops of the servo control device.

5. The machine learning device according to claim 4, wherein:

the third feedforward calculation unit is a current feedforward calculation unit, and the third command is a current command, the current feedforward calculation unit is configured to calculate a current feedforward term for compensating the current command based on the position command and the optimized coefficients of the current feedforward calculation unit obtained by the machine learning, and the servo motor is driven according to the current command compensated by the current feedforward term.

6. The machine learning device according to claim 5, wherein the servo control device includes the position feedforward calculation unit, the velocity feedforward calculation unit, and the current feedforward calculation unit.

7. The machine learning device according to claim 1, wherein initial setting values of the coefficients of the second feedforward calculation unit are the same values as initial setting values of the coefficients of the first feedforward calculation unit.

8. The machine learning device according to claim 1, wherein the processor is further configured to execute the learning machining program to:

acquire, from the servo control device, state information including a servo state including at least a position error and a combination of the coefficients of the first feedforward calculation unit or the second feedforward calculation unit;

output action information including adjustment information of the combination of the coefficients included in the state information to the servo control device;

output a reward value in reinforcement learning, based on the position error included in the state information; and update a value function based on the reward value, the state information, and the action information.

9. The machine learning device according to claim 8, wherein the reward value is based on an absolute value of the position error.

10. The machine learning device according to claim 8, wherein the processor is further configured to execute the learning machining program to generate and output a modified combination of the coefficients of the first feedforward calculation unit or the second feedforward calculation unit based on the updated value function.

11. A servo control system comprising:

the machine learning device according to claim 1; and the servo control device including the at least two feedforward calculation units.

12. A machine learning method related to optimization of coefficients of at least two feedforward calculation units with respect to a servo control device configured to control a servo motor configured to drive a shaft of a machine tool or an industrial machine using feedforward control in which the at least two feedforward calculation units form compensators for multiple loops of the servo control device, the machine learning method comprising:

performing machine learning related to optimization of the coefficients of a first feedforward calculation unit among the at least two feedforward calculation units; and after the machine learning related to optimization of the coefficients of the first feedforward calculation unit is performed, performing machine learning related to optimization of the coefficients of a second feedforward calculation unit among the at least two feedforward calculation units based on the optimized coefficients of the first feedforward calculation unit obtained by the machine learning, wherein a first command is compensated by a feedforward term calculated by the first feedforward calculation unit, and the first command is a command on an inner side of the multiple loops of the servo control device, and wherein a second command compensated by a feedforward term calculated by the second feedforward calculation unit is a command on an outer side of the multiple loops of the servo control device.

13. The machine learning method according to claim 12, wherein:
the first feedforward calculation unit is a velocity feedforward calculation unit, and the first command is a torque command,
the second feedforward calculation unit is a position feedforward calculation unit, and the second command is a velocity command,
the position feedforward calculation unit is configured to calculate a position feedforward term for compensating the velocity command based on a position command and the optimized coefficients of the position feedforward calculation unit obtained by the machine learning,
the velocity feedforward calculation unit is configured to calculate a velocity feedforward term for compensating the torque command based on the position command and the optimized coefficients of the velocity feedforward calculation unit obtained by the machine learning, and
the servo motor is driven according to the torque command compensated by the velocity feedforward term.

14. The machine learning method according to claim 13, further comprising:
performing machine learning related to optimization of the coefficients of a third feedforward calculation unit among the at least two feedforward calculation units; and
after the machine learning related to optimization of the coefficients of the third feedforward calculation unit is performed, performing the machine learning related to optimization of the coefficients of the first feedforward calculation unit based on the optimized coefficients of the third feedforward calculation unit obtained by the machine learning,
wherein a third command is compensated by a feedforward term calculated by the third feedforward calculation unit, and the third command is a command on an innermost side of the multiple loops of the servo control device.

15. The machine learning method according to claim 14, wherein:
the third feedforward calculation unit is a current feedforward calculation unit, and the third command is a current command,
the current feedforward calculation unit is configured to calculate a current feedforward term for compensating the current command based on the position command and the optimized coefficients of the current feedforward calculation unit obtained by the machine learning, and
the servo motor is driven according to the current command compensated by the current feedforward term.

16. The machine learning method according to claim 12, further comprising:
acquiring, from the servo control device, state information including a servo state including at least a position error and a combination of the coefficients of the first feedforward calculation unit or the second feedforward calculation unit;
outputting action information including adjustment information of the combination of the coefficients included in the state information to the servo control device;
outputting a reward value in reinforcement learning, based on an absolute value of the position error included in the state information;
updating a value function based on the reward value, the state information, and the action information; and
generating and outputting a modified combination of the coefficients of the first feedforward calculation unit or the second feedforward calculation unit based on the updated value function.

17. A servo control device configured to control a servo motor configured to drive a shaft of a machine tool or an industrial machine using feedforward control, the servo control device comprising:
a memory storing a learning machining program; and
at least one processor configured to execute the learning machining program to:
calculate a position error value based on a difference between a position command and a position feedback value,
generate a velocity command based on the position error value,
generate first optimized coefficients by performing machine learning on a transfer function of a position feedforward calculation unit,
calculate a position feedforward term based on the position command and the first optimized coefficients,
compensate the velocity command by the position feedforward term to obtain a position-feedforward-controlled velocity command,
calculate a velocity error value based on a difference between the position-feedforward-controlled velocity command and a velocity feedback value,
generate a torque command based on the velocity error value,
generate second optimized coefficients by performing machine learning based on the first optimized coefficients and a transfer function of a velocity feedforward calculation unit,
calculate a velocity feedforward term based on the position command and the second optimized coefficients, and
compensate the torque command by the velocity feedforward term to obtain a velocity-feedforward-controlled torque command.

18. The servo control device according to claim 17, the at least one processor being further configured to execute the learning machining program to:
drive the servo motor using the velocity-feedforward-controlled torque command.

19. The servo control device according to claim 17, the at least one processing being further configured to execute the learning machining program to:
- fix initial setting values of the coefficients of the transfer function of the position feedforward calculation unit and the velocity feedforward calculation unit,
- learn the optimized coefficients of the transfer function of the velocity feedforward calculation unit that minimize the position error value using machine learning,
- adjust the initial setting values of the coefficients of the transfer function of the velocity feedforward calculation unit to the optimized coefficients of the transfer function of the velocity feedforward calculation unit obtained by the machine learning,
- learn the optimized coefficients of the transfer function of the position feedforward calculation unit that minimize the position error value using the machine learning, under condition of the velocity feedforward term calculated based on the optimized coefficients of the transfer function of the velocity feedforward calculation unit, and
- adjust the initial setting values of the coefficients of the transfer function of the position feedforward calculation unit to the optimized coefficients of the transfer function of the position feedforward unit obtained by the machine learning, wherein the learning of the optimized coefficients of the transfer function of the velocity feedforward calculation unit is separately performed earlier than the learning of the optimized coefficients of the transfer function of the position feedforward calculation unit to suppress a variation in the position error value.

20. The servo control device according to claim 19, the at least one processor being further configured to execute the learning machining program to:
- calculate a current error value based on a difference between the velocity-feedforward-controlled torque command and a current feedback value,
- generate a current command based on the current error value,
- calculate a current feedforward term based on the position command and optimized values of coefficients of a current feedforward calculation unit obtained based on the machine learning,
- compensate the current command by the current feedforward term to obtain a feedforward-controlled current command, and
- drive the servo motor using the feedforward-controlled current command.

* * * * *